United States Patent [19]

Smith

[11] Patent Number: 5,197,254

[45] Date of Patent: * Mar. 30, 1993

[54] WOVEN WIRE STRUCTURES

[75] Inventor: Bradford L. Smith, Santa Fe, N. Mex.

[73] Assignee: Sally Mayer, Santa Fe, N. Mex.

[ * ] Notice: The portion of the term of this patent subsequent to May 22, 2007 has been disclaimed.

[21] Appl. No.: 525,404

[22] Filed: May 17, 1990

Related U.S. Application Data

[63] Continuation-in-part of Ser. No. 319,653, Mar. 2, 1989, Pat. No. 4,927,674, and a continuation-in-part of Ser. No. 466,041, Jan. 17, 1990, Pat. No. 5,114,300.

[51] Int. Cl.$^5$ ............................................... E04H 12/00
[52] U.S. Cl. ...................................... 52/653.1; 428/11
[58] Field of Search ................... 52/648, 646, 645; 428/11, 12

[56] References Cited

U.S. PATENT DOCUMENTS

| | | |
|---|---|---|
| 872,954 | 12/1907 | Martin . |
| 998,479 | 7/1911 | Eisen . |
| 1,066,212 | 7/1913 | Meltzer . |
| 1,620,640 | 3/1926 | Friedrich . |
| 3,020,660 | 3/1062 | Scherotto ................................ 41/15 |
| 3,169,611 | 3/1960 | Snelson . |
| 3,272,976 | 9/1966 | Charchan et al. ..................... 240/10 |
| 3,324,611 | 6/1967 | Gamber .................................. 52/91 |
| 3,387,868 | 6/1968 | Borden . |
| 3,546,049 | 12/1970 | Kostick . |
| 4,927,674 | 5/1990 | Smith ............................... 428/12 X |

Primary Examiner—David A. Scherbel
Assistant Examiner—Creighton Smith
Attorney, Agent, or Firm—Deborah A. Peacock; Donovan F. Duggan

[57] ABSTRACT

A woven wire structural unit comprising multi-wire bundles. The bundles are connected at respective ends, and thereafter rigidly fixed. A variety of configurations may be formed, including but not limited to linear arrays, planar arrays, columnar or cylindrical configurations, spherical and hemispherical configurations, cubic configurations, and other polyhedronal configurations.

53 Claims, 24 Drawing Sheets

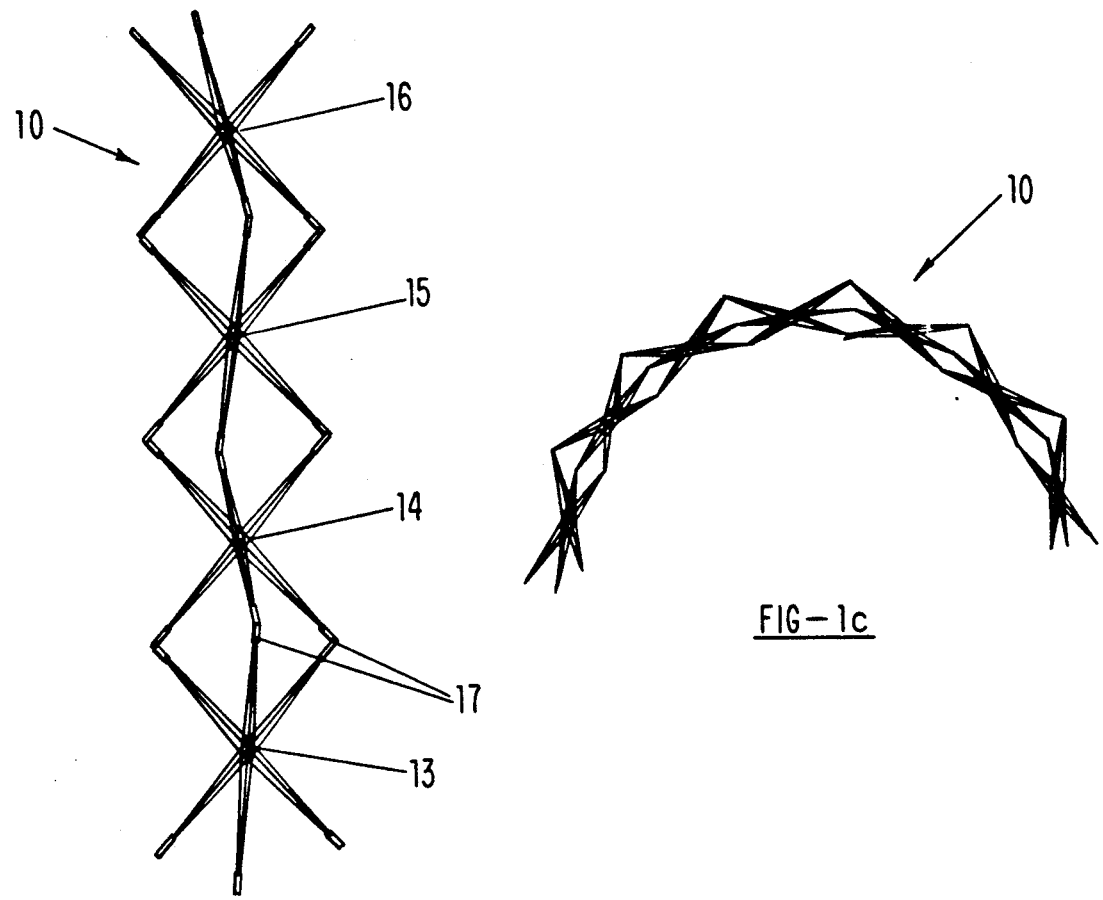
FIG-1c
FIG-1a
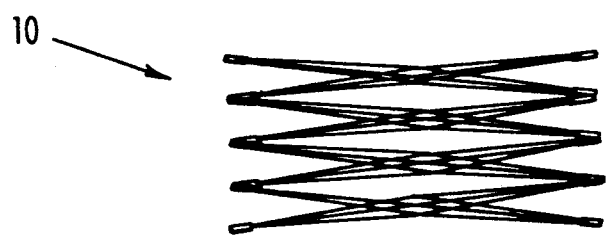
FIG-1b

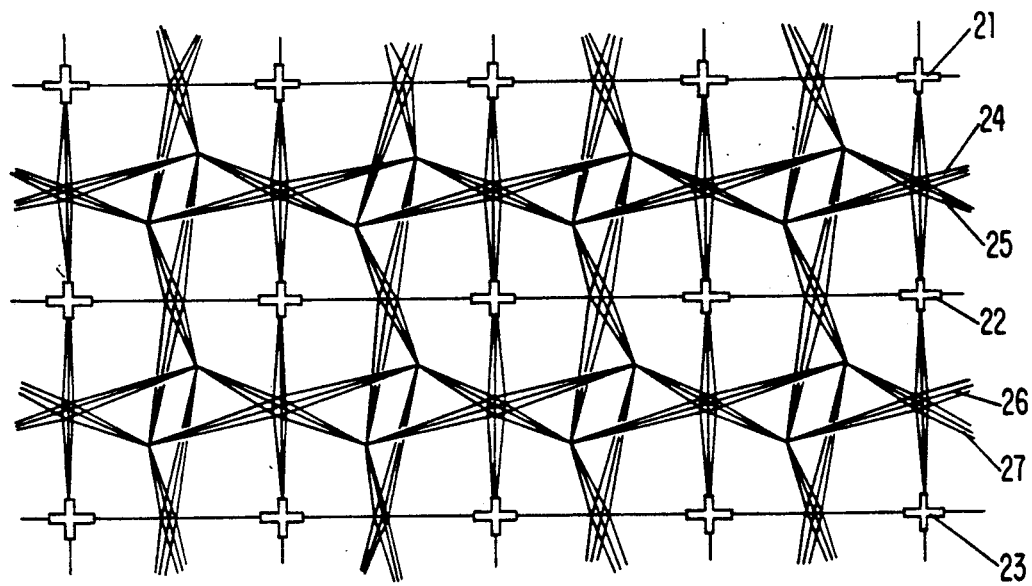
FIG-2
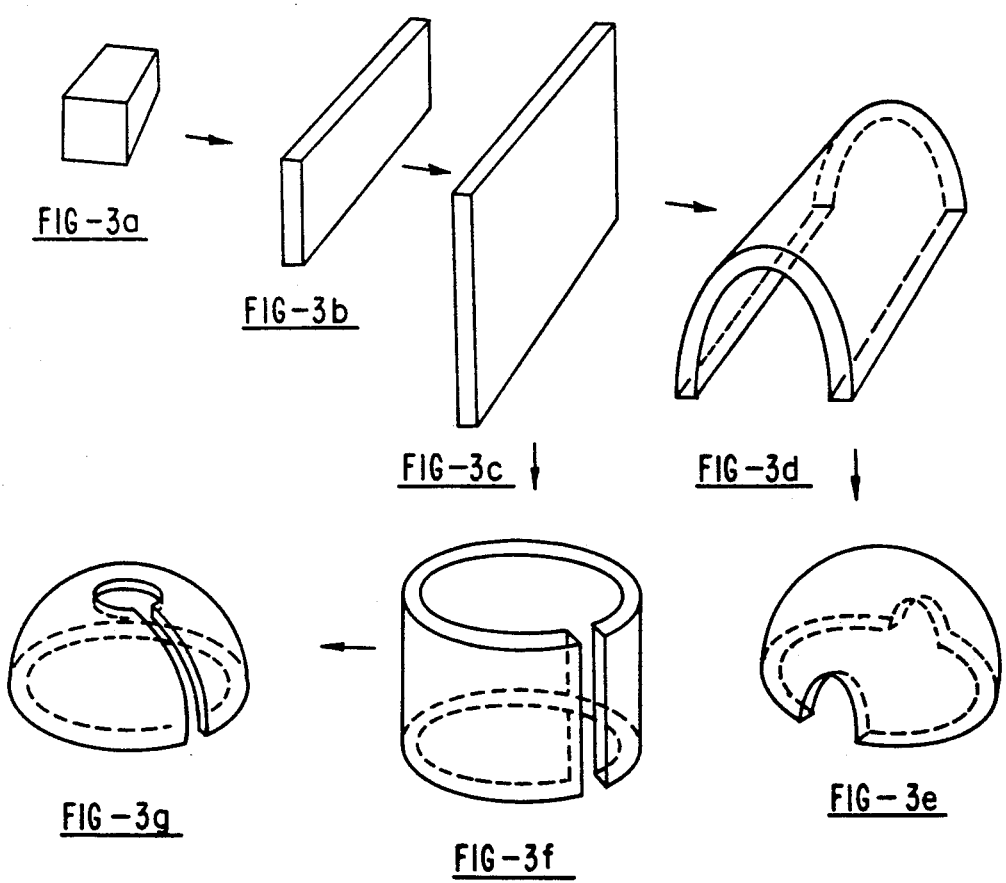
FIG-3a
FIG-3b
FIG-3c
FIG-3d
FIG-3e
FIG-3f
FIG-3g

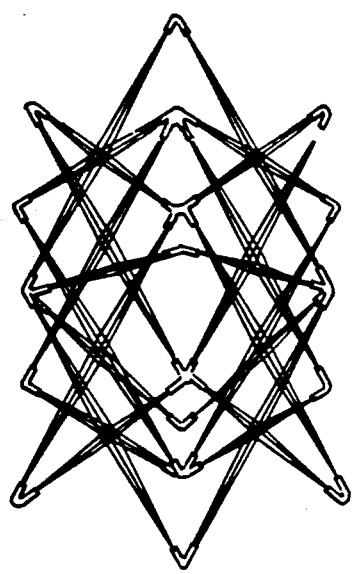
FIG—7a
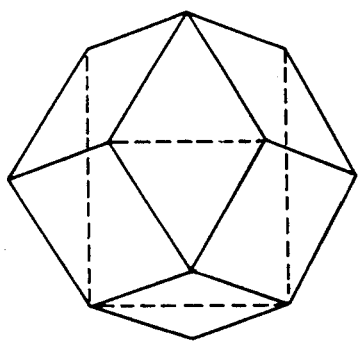
FIG—7b
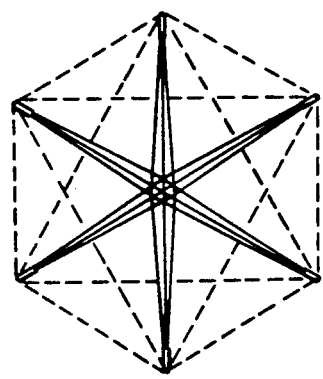
FIG—7c
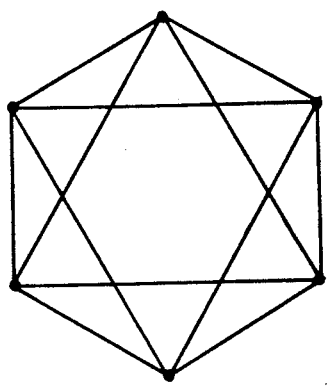
FIG—7d
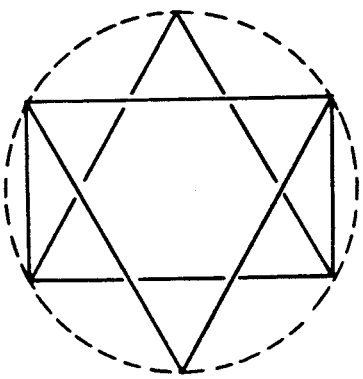
FIG—7e

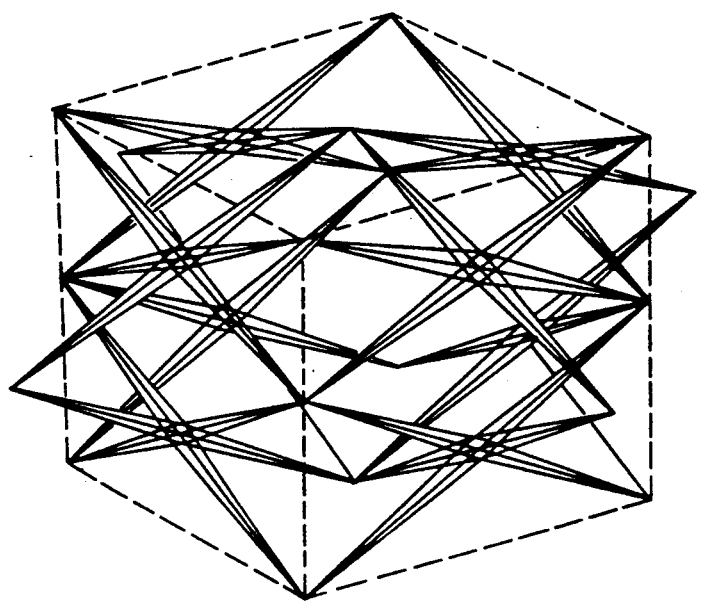
FIG — 7f
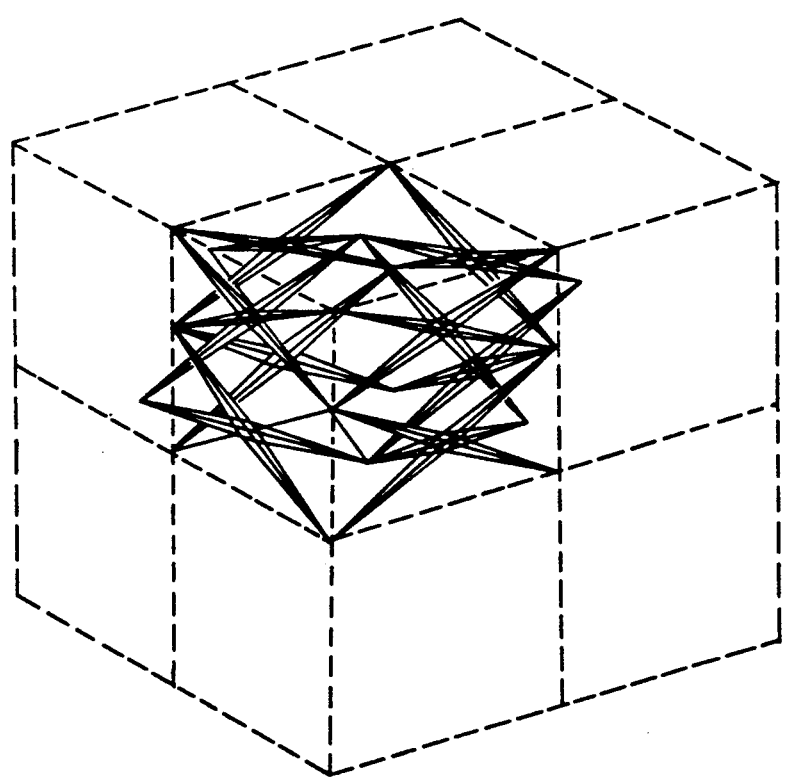
FIG — 7g

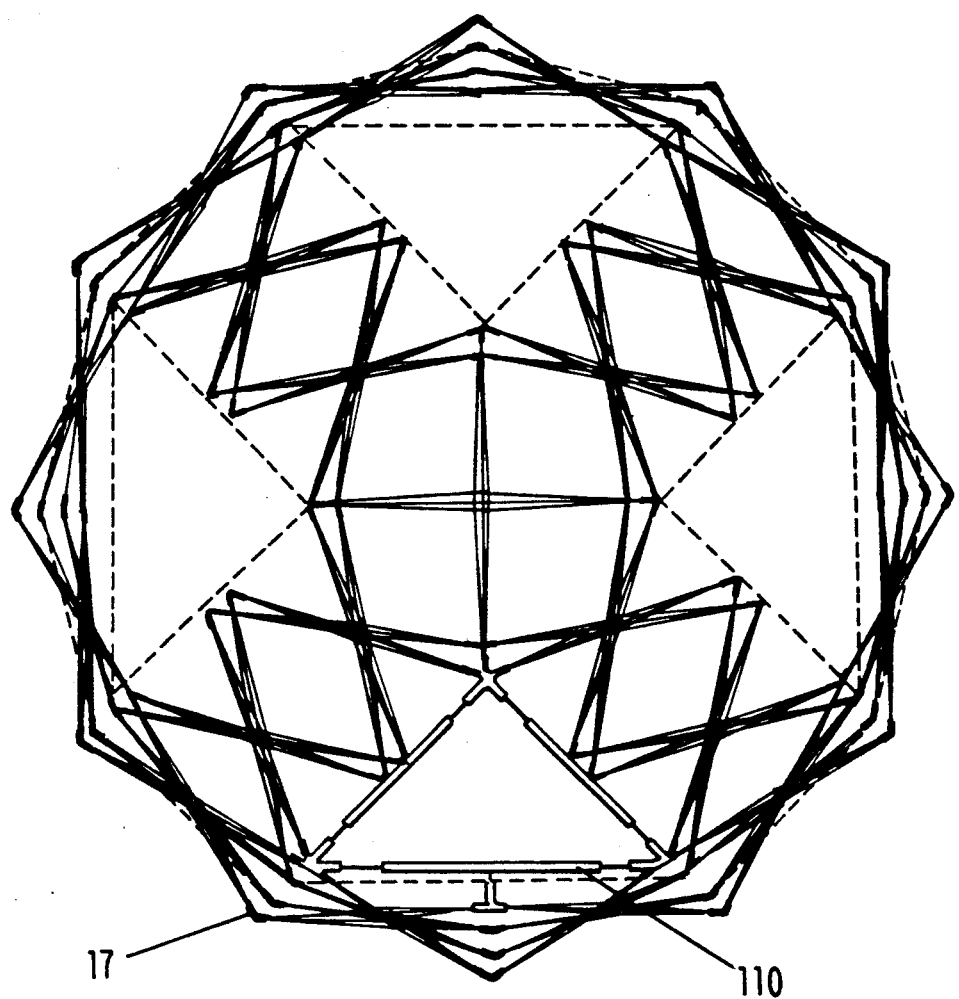
FIG —11a
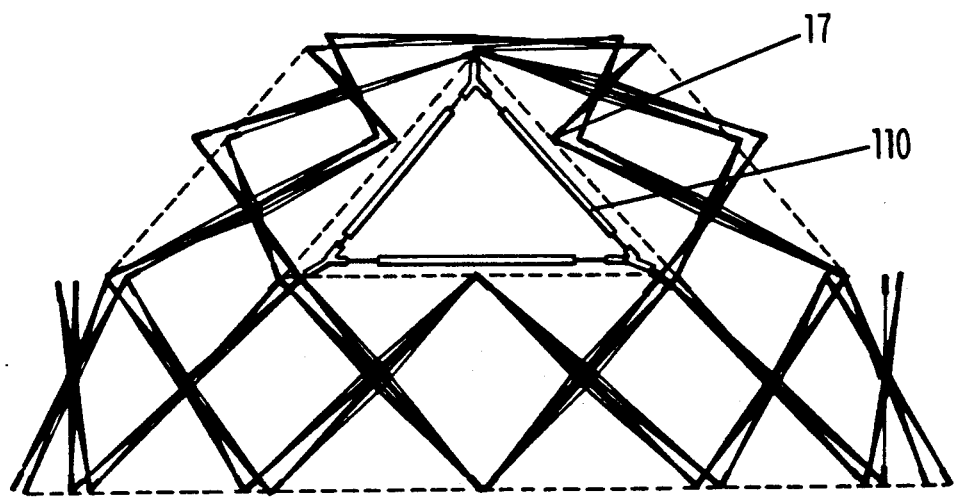
FIG —11b

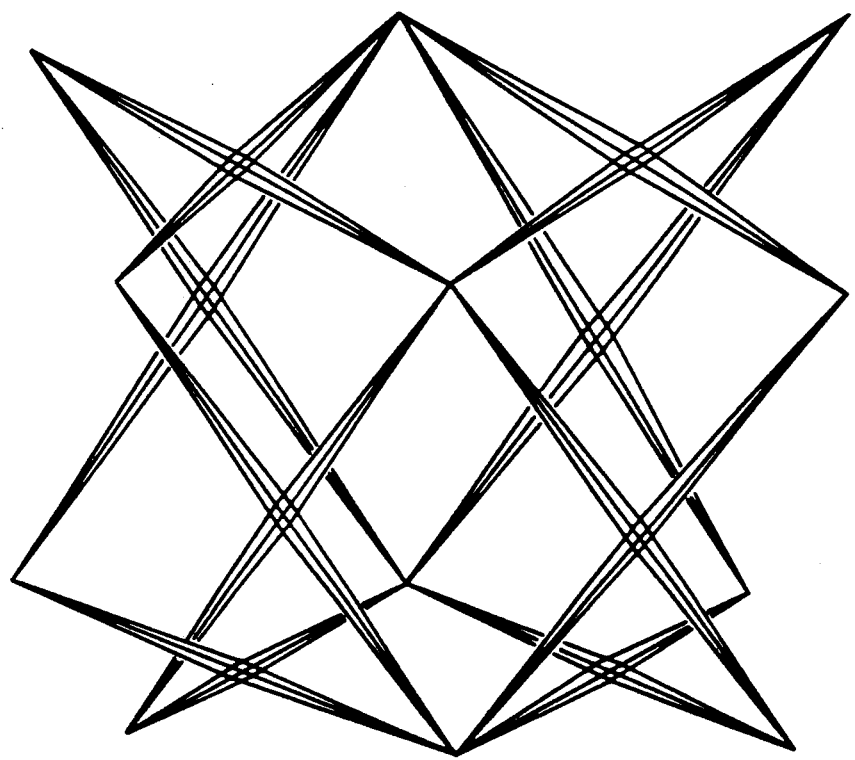
FIG — 12

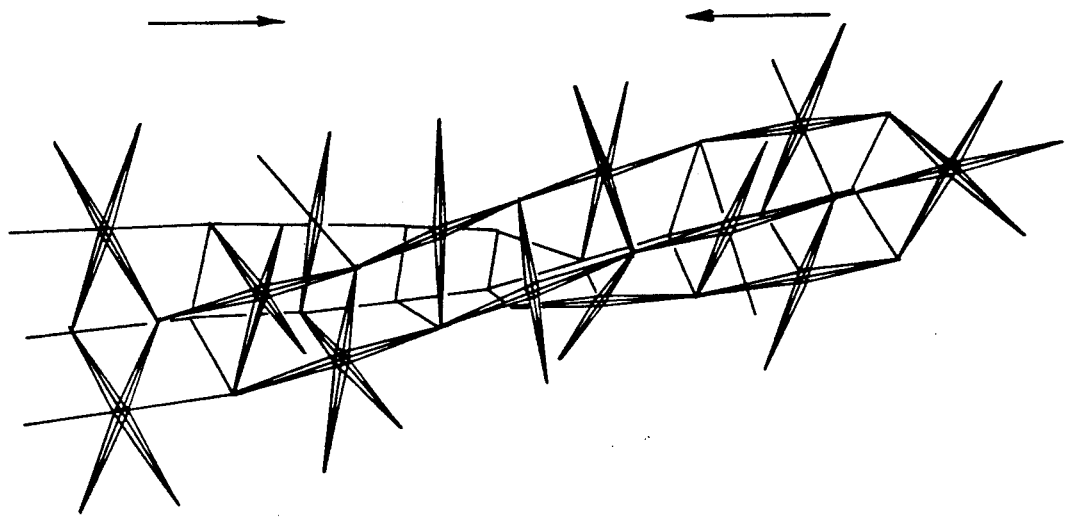
FIG—13c
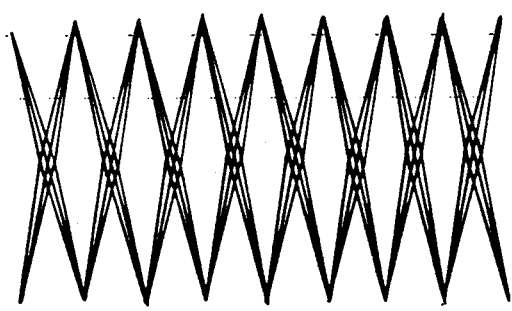
FIG—13d
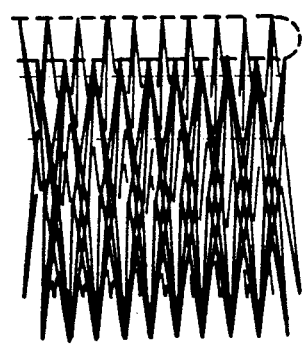
FIG—13e

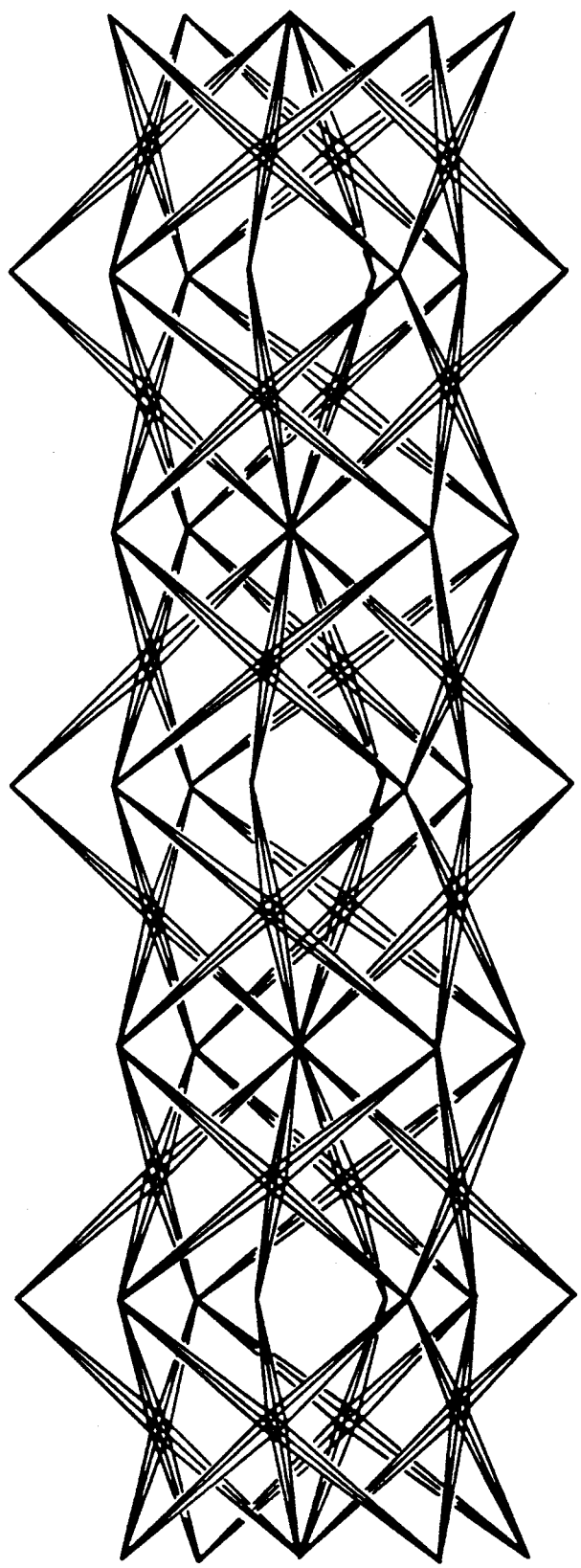
FIG—14

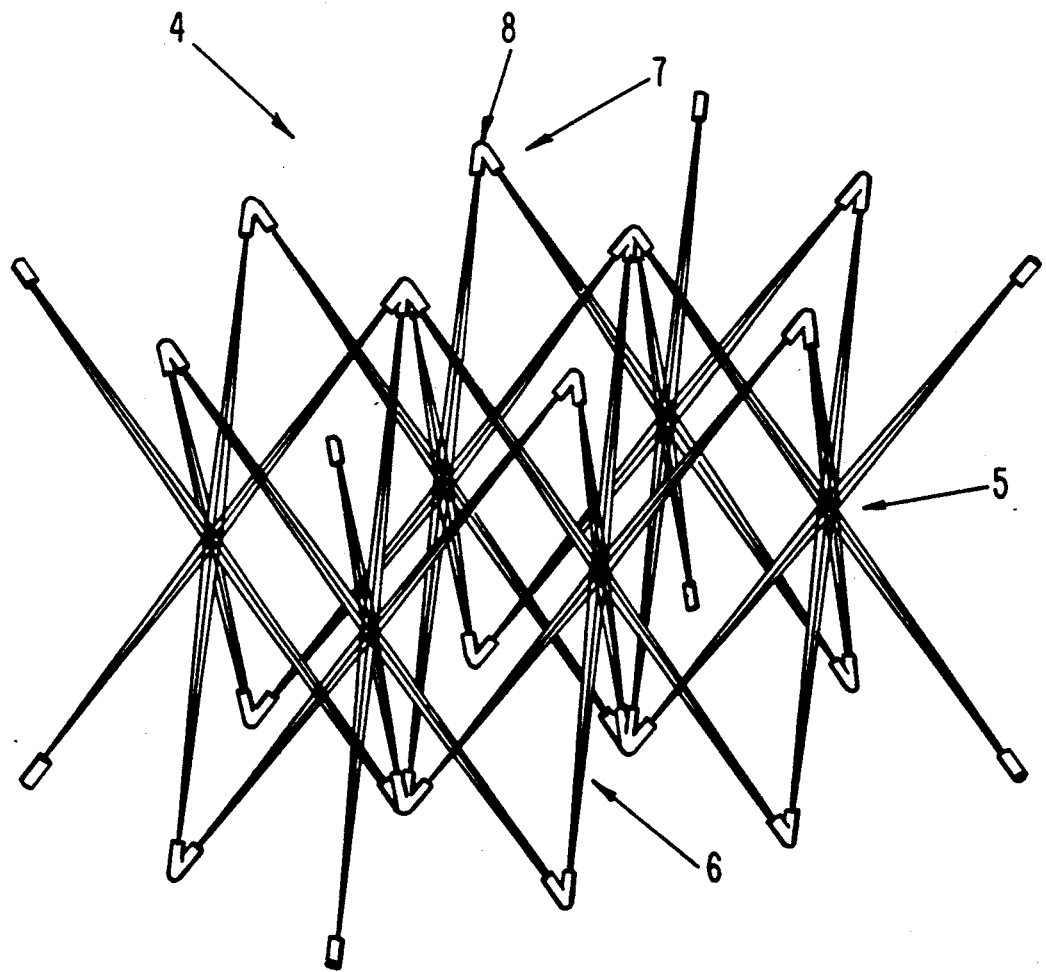
FIG—17
PRIOR ART

WOVEN WIRE STRUCTURES

CROSS REFERENCE TO RELATED APPLICATIONS

This application is a continuation-in-part application of U.S. Pat. Ser. No. 07/319,653, entitled *Woven Wire Apparatus* to Smith, filed Mar. 2, 1989, to be issued on May 22, 1990, as U.S. Pat. No. 4,927,674, and U.S. Pat. Application Ser. No. 07/466,041, entitled *Robotic Apparatus*, to Shahinpoor, et al., filed on Jan. 17, 1990, now U.S. Pat. No. 5,114,300, the teachings of both of which are incorporated herein by reference.

BACKGROUND OF THE INVENTION

1. Field of the Invention (Technical Field)

The present invention relates to woven wire structures formed from a plurality of woven wire bundles, in linear, planar, cylindrical, spherical, or polyhedral configurations. The present invention also relates to woven wire structures formed from a single bundle and fixed into position.

2. Description of the Related Art Including Information Disclosed under 37 C.F.R. §§1.97-1.99 (Background Art)

Traditional buildings such as frame houses, geodesic domes, multi-story structures, prefabricated buildings, and the like, normally require stable, rigid frameworks. Such frameworks, whether assembled on or off the actual building site, are bulky, cumbersome, and costly to transport, assemble, and erect.

Further, since such frameworks are rigid, they are susceptible to stress such as volcanic earthquakes, fault movement, mud slides, high winds, and the like; the resultant strain is often localized at framework joints, resulting in failure and collapse. Moreover, localized strain can result in less severe damage, such as cracking of walls and ceilings.

The need thus exists for a structural framework capable of distributing stress evenly throughout, such that failure of a given joint from accumulated strain is unlikely.

U.S. Pat. No. 3,546,049, to Kostick, entitled *Symmetrical Non-Cartesian Multiple-Axis Joining of Beams*, teaches multiple axis joining of flexible-element beams. The single joint thus formed may be rigidified, as by welding. Kostick provides no teaching or suggestion of linking such joints into a singular or multi-bundle structural unit.

Reference is made to FIG. 17 which shows a prior art toy or amusement device 4, having several wires "woven" together at central woven wire joints 5. As seen therein, several pluralities of wire bundles 6 are also joined at their tips 7 using flexible tubing such as neoprene tubing 8. Prior art device 4 may be "accordioned" by a user, either horizontally or vertically, and the bundles 6 are movable in concert about their joints 5. This device 4 is an "executive toy," and is not adapted to other uses. Most notably, the joints 5 of device 4 are not adjustable for movability or fixable, but are quite flexible at all times, making the device unstable. Thus, this device 4 is unsuited to serve as a support structure, or other purpose served in accordance with the invention.

Prior application Ser. No. 07/319,653, entitled *Woven Wire Apparatus*, to Smith, to be issued on May 22, 1990, as U.S. Pat. No. 4,927,674, filed Mar. 2, 1989 (hereinafter "parent Pat. No. 4,927,674"), the teachings of which are incorporated herein by reference, relates to a woven wire apparatus comprising a bundle, such bundle comprising a plurality of multi-wire elements. Each multi-wire element has a first end and a second end. The wires comprise stiff but slightly flexible wires which may be solid or hollow, and may be of the same or different lengths. The wires may be electrically conductive, and the hollow wires may transmit liquids, gases, or solids. The wires may themselves serve as enclosing conduits for piping or electrical wiring.

Parent U.S. Pat. No. 4,927,674 also discloses that the multi-wire bundle is collapsible and the multi-wire elements thereof preferably comprise an odd number of wires. Further, end joining means are removably positionable on the ends of the multi-wire elements and may comprise tubular caps, flat bases, suction bases, balls, padded bases, or the like. Also, the end joining means may comprise rigid connectors, movable connectors, and mechanical hinge structures.

Parent U.S. Pat. No. 4,927,674 also discloses wire retainers which are preferably cylindrical, slidable, and movably positionable as the multi-wire elements. The wire retaining structure may also comprise rings, tabs, cinches, straps, clips, or the like, fixable about the wires or a joint. Both wire retainers and end retaining means may be color coded.

Parent U.S. Pat. No. 4,927,674 also discloses that the apparatus may comprise two or more bundles positionable in an adjoining relationship, being stackable or positionable side by side. Additionally, the apparatus of the parent application may comprise dynamic means, such as for a pump.

Copending application Ser. No. 07/466,041, filed Jan. 17, 1990, entitled *Robotic Apparatus*, to Shahinpoor, et al., the teachings of which are incorporated herein by reference, discloses a movable robotic structure comprising woven wire structure.

SUMMARY OF THE INVENTION (DISCLOSURE OF THE INVENTION)

The preferred embodiment of the invention comprises a woven wire structural unit comprising at least two bundles, each bundle comprising a plurality of intersecting multi-stranded wire elements having two ends; connecting means for connecting respective ends of the bundles; and fixing means for imparting rigidity to the bundles. The bundles may be connected in linear arrays, planar arrays, or three-dimensional arrays. The bundles may be collapsible.

The linear arrays may be connected in parallel mirror configuration, parallel translated configuration, or in parallel mirror and translated configuration. The linear arrays may further comprise a tower or arch configuration.

The three-dimensional arrays may comprise hemispherically or spherically disposed arrays, cylindrically disposed arrays, cubically disposed arrays, planar polygonal columnar configurations, or polyhedronal columnar configurations. The polyhedronal columnar configurations may form an arch, or extend from planar arrays.

In the preferred embodiment of the invention, the connecting means may be movable or fixed. Movable connecting means may comprise ball-and-socket joints, flexible sleeves, hinged joint means, and the like. Fixed connecting means may comprise tension cables, bolt means, weld means, screw means, soldered connection means, and the like.

In the preferred embodiment of the invention, the fixing means may comprise ring means, weld means, bolt means, soldered means, covering means (e.g., fabric) and the like. The fixing means may also comprise injectable hardenable substance means, including concrete, GUNITE ®, fusible alloys, mud, glass, ceramics, and the like.

Fewer than all of the bundles may be fixed. Further, said fixing means may permit limited movement of said bundles.

The multi-stranded wire elements may comprise a like plurality of wires, preferably an odd number, such as three, five, or seven wires. The wires and/or elements may be of substantially similar lengths or substantially different lengths. The wires may be hollow, useful for transmitting solids, liquids and electricity. Support members may be provided to assist the rigidity.

The invention is useful for support structures, dome structures, woven fabric structures, and the like.

In an alternative embodiment, the invention comprises a single bundle having a plurality of intersecting multi-stranded wire elements with two ends; means for positioning the multi-stranded wire elements in a mutually intersecting relationship to one another; means for joining the first and second ends of the multi-stranded wire elements whereby the elements are retained in this intersecting relationship; and fixing means additional to the positioning means and the joining means for fixing the bundle in a rigid position. Fixing means, such as rings, bolts, soldering, using hardenable substances (e.g., concrete, GUNITE ®, fusible alloys, mud, glass, and ceramics), and covering material, such as fabric, are useful for this embodiment. This embodiment is useful as a tee-pee structure.

It is a primary object of the invention to provide sound structural frameworks using woven wire bundles.

It is a further object of the invention to provide a woven wire structural framework usable in a variety of configurations.

Yet another object of the invention is to provide a structural framework capable of distributing potentially damaging stresses.

Still another object of the invention is the provision of diverse connecting means for the structural units.

Another object of the invention is the provision of diverse rigid or semi-rigid fixing means to retain the configuration of the structural units.

An advantage of the present invention is that it is lightweight and easily transportable in the collapsed state.

A further advantage of the present invention is the ease with which structural units may be connected, configured, and fixed.

Yet another advantage of the present invention is the ease of manufacture and low cost of the structured units.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

In the drawings:

FIG. 1a shows four structural units of the invention in a linear array;

FIG. 1b illustrates the linear array of FIG. 1a in a collapsed position;

FIG. 1c shows a linear array in a curviform or arched configuration;

FIG. 2 illustrates a planar configuration comprising two dissimilar patterns of linked structural units integrated within a planar grid.

FIGS. 3a-3g show a progression of woven wire structural units from a collapsed two-dimensional state to a planar configuration (see FIGS. 3b and 3c), to a curved arch (see FIG. 3d), into a hemispheric dome (see FIG. 3e); alteratively to a cylinder (see FIG. 3f), then to a hemispheric dome (see FIG. 3g).

FIGS. 7a-7e depict a hexagonal configuration of eight units in a polyhedral configuration that holds a rhombic dodecahedron volumetric shape;

FIGS. 7f and 7g depict the configuration of FIGS. 7a-7e as a unit cell in a cubic lattice;

FIG. 11a shows a top view of a hemispherical or spherical configuration;

FIG. 11b depicts a side view of the hemispherical configuration of FIG. 11a;

FIG. 12 depicts an open cubic embodiment;
FIGS. 13b-13e depict the cubic structure of FIG. 13a in column form (see FIG. 13b), open (see FIG. 13b), partially collapsed (see FIG. 13c), and folded into a bundle (see FIGS. 13d and 13e);
FIG. 14 depicts a polyhedral columnar embodiment;
FIG. 17 a prior art toy device.

Figure 1D:
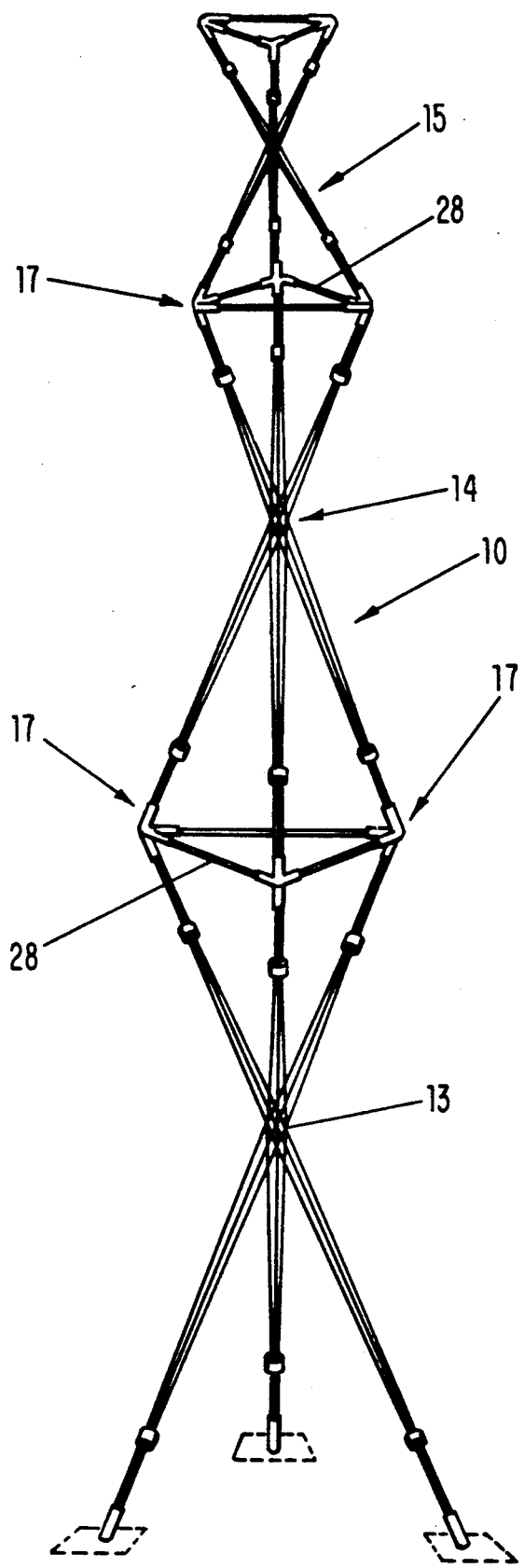
FIG. 1d depicts a linear array in a tower configuration.

DETAILED DESCRIPTION OF THE PREFERRED EMBODIMENTS OF THE INVENTION (BEST MODES FOR CARRYING OUT THE INVENTION)

The present invention relates to various structures comprising two or more woven wire joints or bundles which are joined, connected, or linked together, then selectively fixed. The present invention also relates to a structure formed from a single woven wire joint or bundle.

As disclosed in prior Parent U.S. Pat. No. 4,927,674, the teachings, specification, and drawings of which are incorporated herein by reference, each woven wire joint or bundle comprises a plurality of multi-wire, or multi-stranded, elements having first and second ends. The multi-wire, or multi-stranded, elements each comprise preferably an odd number of flexible, but slightly stiff wires (for example, three, five, or seven wires). Any number of such multi-wire elements may be intertwined to form the bundle or joint. The wires preferably comprise generally rigid, but somewhat resilient or flexible wire, such as steel piano wire, but can comprise bendable wire such as copper and aluminum. The wires can also be made of plastic, wood, and other such materials and of any structurally desirable length and diameter. The element can be a very small size (e.g., useful for a woven fabric structure), such as from less than an inch in length, to a very large size (e.g., useful for a building structure), such as many yards, since the principles of the invention apply no matter what the scale. The wires can be solid or tubular, and can be telescoping, lockably or unlockably. The wires can be extended with poles or the like attached to the ends. Hollow wires can be used to transmit liquids, gas, or solid materials. The wires can be used to transmit electricity, or can be used as conduit to enclose electrical wiring or plumbing. The term "wire," as used throughout the specification and claims, includes all such variations.

In the preferred embodiment, the basic woven wire structure comprises at least two multi-wire bundles. Respective ends of the bundles are joined or linked. Such end joining means may comprise rigid, flexible, movable, or fixed attachment means. Examples of rigid or fixed attachment means are tension cables, bolts, screws, welds, brazes, bonding, soldered connections, and the like, all well known in the art. Examples of flexible or movable attachment means are flexible sleeves, tubing, cables, ball-and-socket joints, hinges, and the like, equally well known in the art.

After the desired number of bundles or joints are attached to each other, the resulting framework is shaped to the desired configuration and subsequently rigidified or fixed in position. The fixing may be of a permanent or semi-permanent nature. Such fixing comprises the means disclosed herein or in prior Parent U.S. Pat. No. 4,927,674 or other fixing means common to the art; and may involve all or some of the bundles or joints depending upon contemplated usage or anticipated stress. Further, selected bundles or joints may be fixed such as to permit limited movement of selected multi-wire elements within selected bundles.

In addition to the retainers disclosed in prior Parent U.S. Pat. No. 4,927,674 (rings, tubes, cinches, straps, clips, and the like), other fixing means, such as welds, bolts, brazes, soldering, and the like, well known in the art, may be used.

Further, fixing may be accomplished by introducing or injecting various hardenable or settable substances to, inside, or around the framework, including but not limited to concrete, GUNITE ®, cement, various fused alloys, ceramics or glass, mud, cloth (e.g., tenting material), and the like. Such fixing substances and means may be selectively applied to some or all of the bundles in the framework to achieve the desired degree of rigidity and permanency.

Throughout the specification, analogy will be made between the various embodiments of the invention, and the crystallographic model. While not entirely apt in all cases (the multi-wire bundle is obviously three-dimensional), it is believed such analogy will better enable those ordinarily skilled in the art to make and use the invention.

With specific reference to FIG. 1a, a "one-dimensional" linear array of woven wire structures is therein depicted. Linear array 10 comprises four woven wire structural units or joints 13, 14, 15, and 16. The structural unit need not comprise four multi-wire bundles, but may comprise at least two and any plurality of said bundles or joints.

By analogy to crystallographic example, multi-wire bundles 13, 14, 15, and 16 can be likened to one-dimensional "motifs" repeated regularly along a single line. The multi-wire bundles or joints comprise the "motifs."

Respective ends of the multi-wire bundles or joints are linked or attached, such as at 17, to form linear array 10. As disclosed in prior Parent U.S. Pat. No. 4,927,674 and herein, such end linking or attachment may be rigid, flexible, movable, or fixed, depending upon contemplated usage of linear array 10. The drawings illustrate flexible and rigid end connectors that may be used; however, the invention is not limited to these particular connectors.

After linking or attaching multi-wire bundle ends 17, linear array 10 is then shaped and conformed to the desired final configuration. Such final configuration may comprise an arch, as in FIG. 1c, a tower, as in FIG. 1d, or other linear structures for example a cylinder when the linear array is continuously curved so that the ends of the linear array touch.

With specific reference to FIG. 1b, a linear array in the collapsed state is therein depicted. The array in this state need only be conformed to the desired configuration and thereafter fixed in position. The advantages of lowered space and storage requirements, as well as ease of transport are apparent.

FIG. 1c illustrates a linear array shaped in an arch configuration. Additionally, depending upon contemplated use and anticipated stress, various other configurations of the linear array will occur to those ordinarily skilled in the art. Further, of course, any of the end joining or attachment means and fixing means disclosed herein or in prior Parent U.S. Pat. No. 4,927,674, or other such means common to the art, may be used in combination with the woven wire structural unit.

FIG. 1d shows a linear array comprising three multi-wire bundles or joints 13, 14, and 15 in a tower or columnar (or cylindrical) configuration. End joining means 17 may be flexible or rigid depending upon intended use; cross members 28 lend rigidity to the structure. Also, depending upon projected use and anticipated stress, all, some, or none of multi-wire bundles or joints 13, 14, and 15, may be rigidly or semi-rigidly fixed by the means disclosed herein, or in prior Parent U.S. Pat. No. 4,927,674, or by other means common to the art.

Figure 1E:
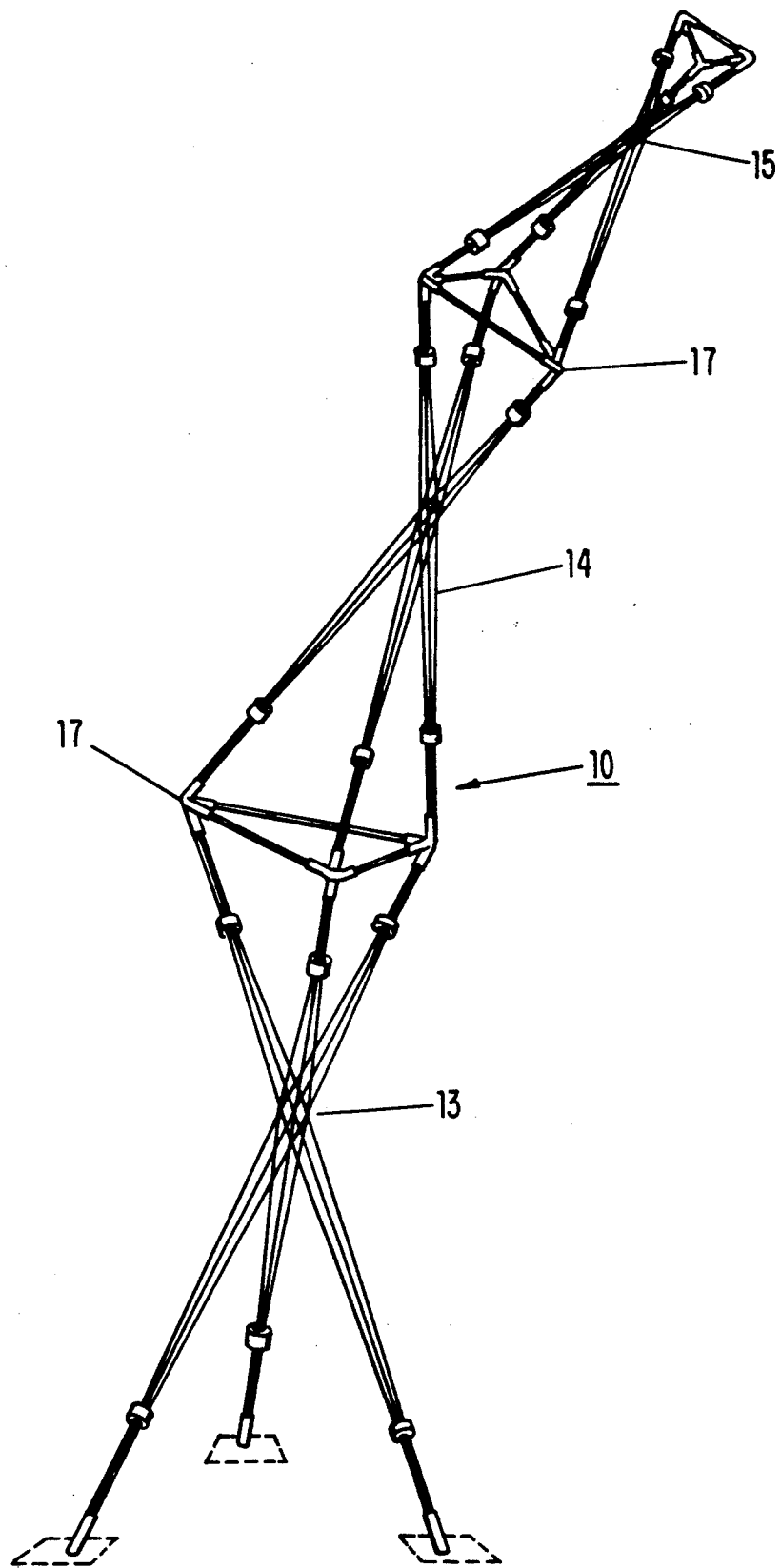
FIG. 1e depicts a linear array in a bent position.

FIG. 1e shows the tower structure of FIG. 1d in an inclined position. Again, various configurations of linear arrays will occur to those ordinarily skilled in the art. Also, of course, various end joining means and fixing means may be used in such configurations.

Figure 1F:
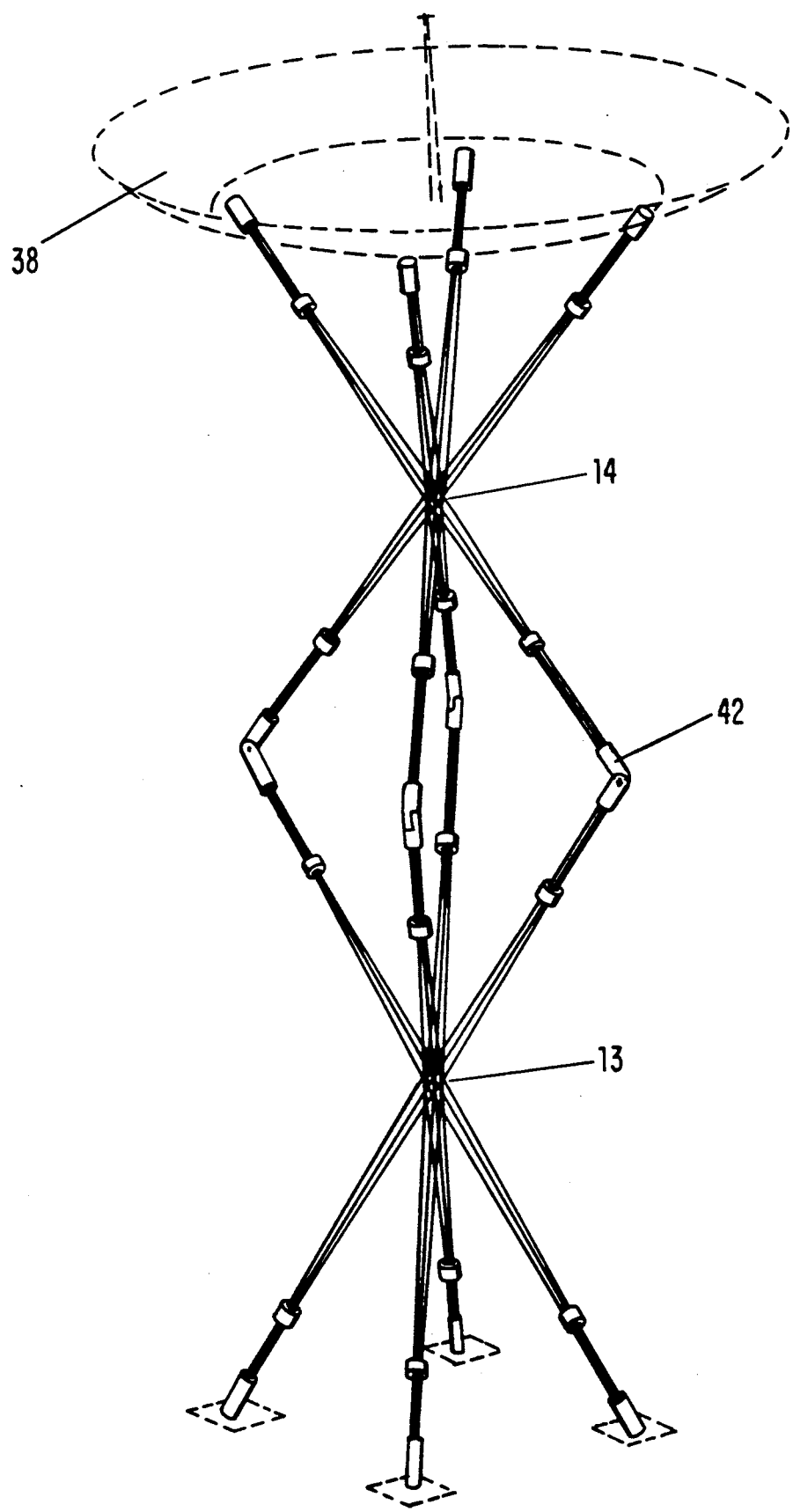
FIG. 1f depicts a linear array in a support configuration.
Figure 1G:
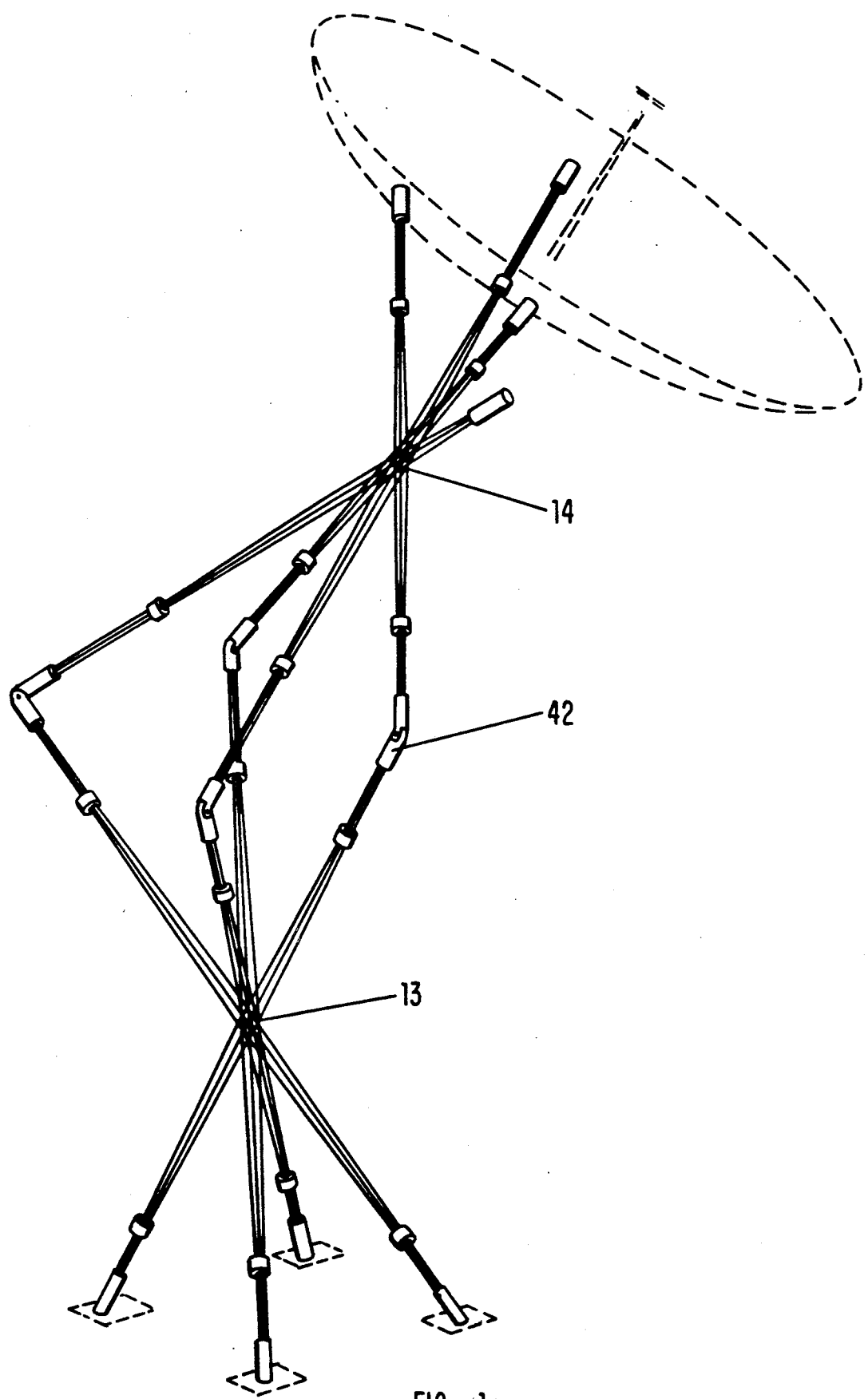
FIG. 1g depicts the linear array of FIG. 1f in a bent position.
Figure 1H:
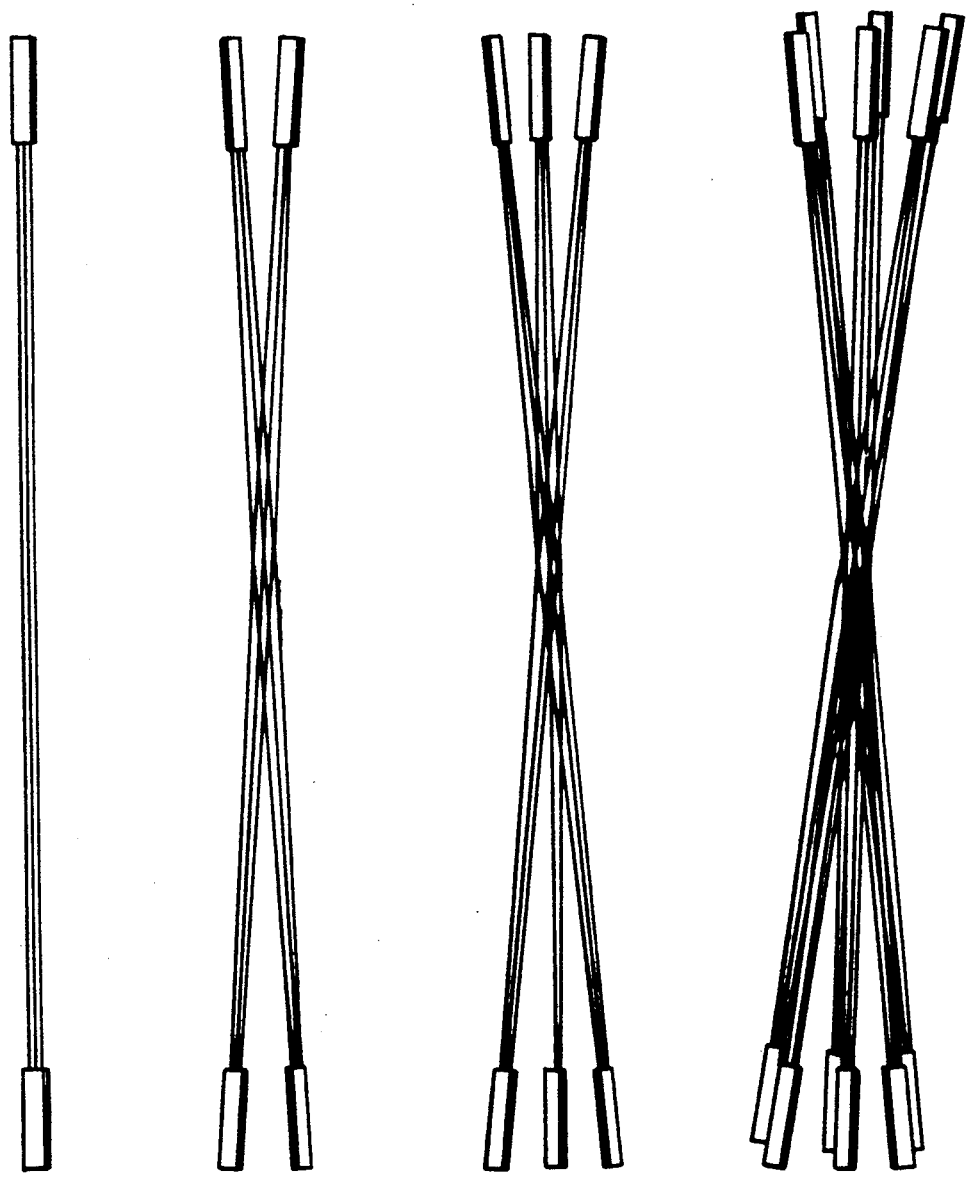
FIG. 1h depicts a variety of multiple bundles.
Figure 1I:
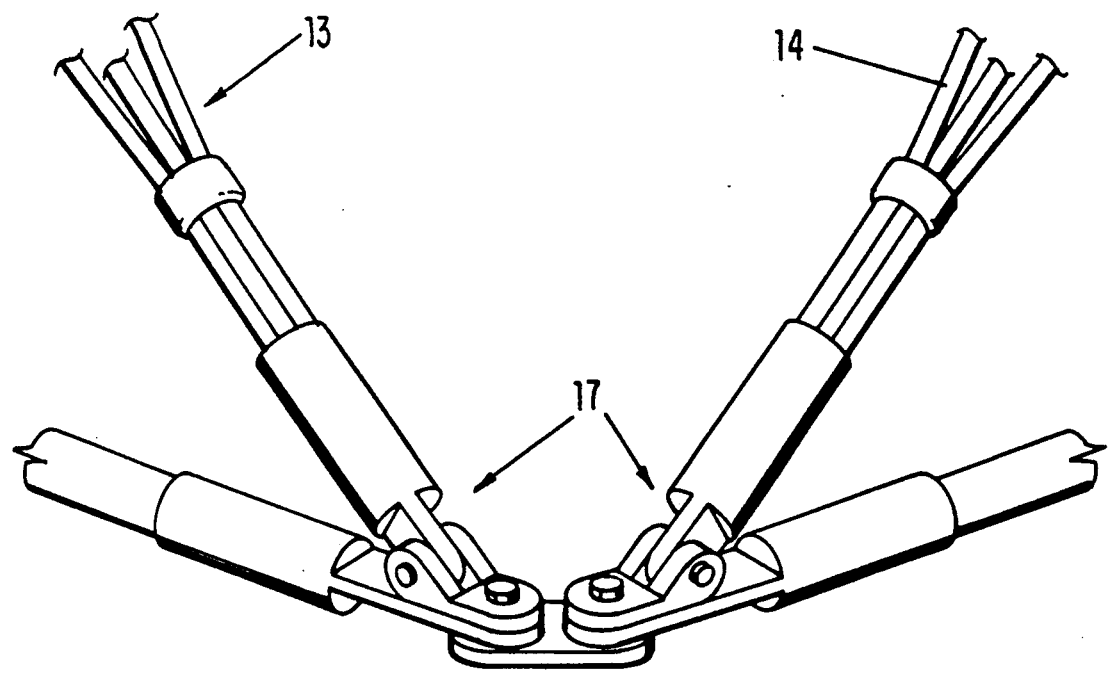
FIG. 1i depicts a rigid end connection.
Figure 1J:
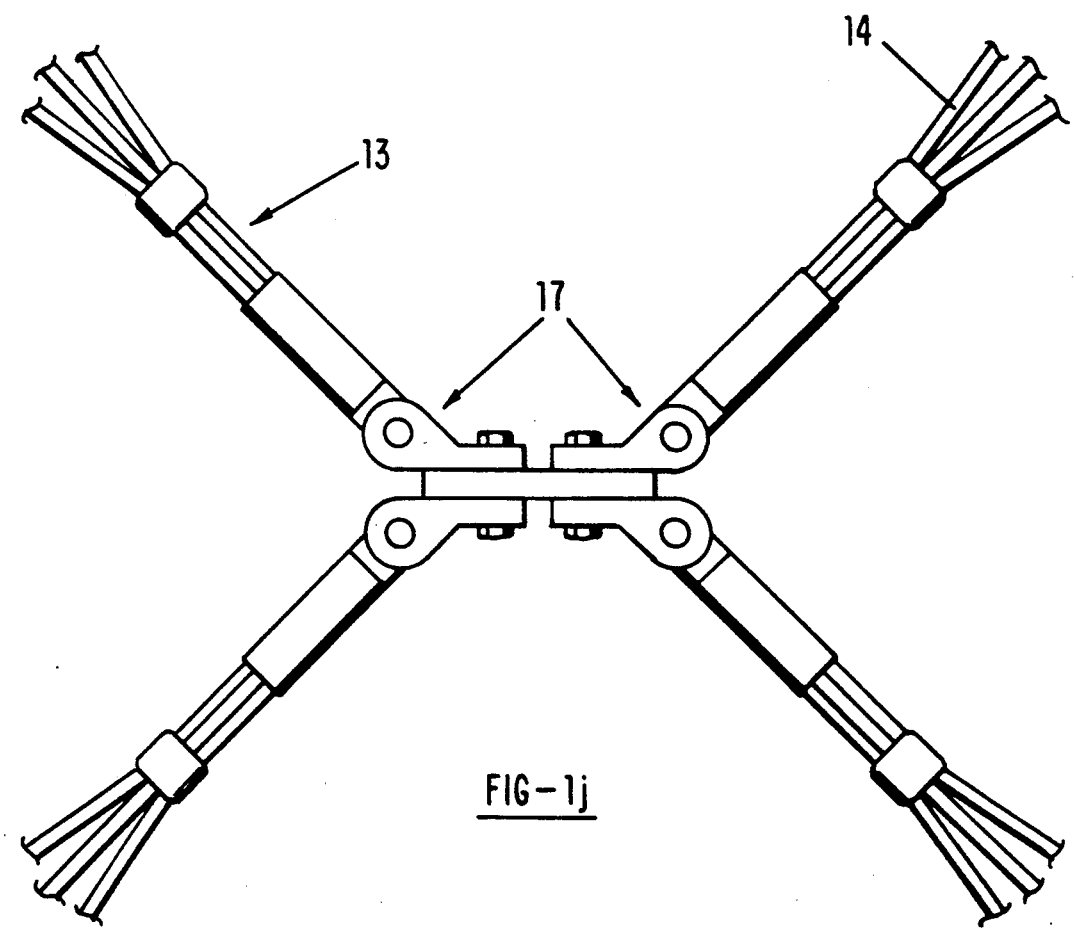
FIG. 1j depicts another rigid end connection.

FIGS. 1f and 1g, comprising a two-multi-wire bundle structural unit (e.g., for supporting an antenna 38), presents a similar configuration to those shown in FIGS. 1d and 1e. End joining means 42 is depicted as a hinged joint; any other disclosed end joining means may be used to link or attach bundles 13 and 14. And, again, rigid or semi-rigid fixing means, heretofore disclosed, could be selectively applied to bundles or joints 13 and 14.

FIG. 2 represents a "two-dimensional" or planar configuration of the preferred embodiment of the invention. By analogy to the crystallographic model, the planar or "two-dimensional" array is created by placing linear arrays in parallel, either mirror symmetrical or translated ("glided") relative to each other, thereby creating another dimension. In FIG. 2, parallel linear arrays 21, 22, and 23 are in mirror symmetry with each other comprising one planar array, while linear arrays 24, 25, 26, and 27 are translated or "glided" relative to each other, comprising another planar array. While FIG. 2 depicts both such planar arrays as interwoven with each other, they need not be; each planar array may be used individually and separately.

Since the planar arrays basically comprise linear arrays, the multi-wire bundles or joints can be attached or joined to each other as aforesaid. Similarly, the multi-wire bundles may be fixed in the manner applicable to such bundles in linear arrays.

Nevertheless, since planar arrays comprise an additional dimension, they are capable of more diverse utility than linear arrays. FIG. 3 illustrates two examples of forming a hemispheric dome with planar arrays: FIGS. 3a-3e, show the formation of a planar array (3c), subsequent formation of a lengthwise-oriented semicylinder (3d), and ultimate formation of a three-dimensional hemispheric dome (3e); FIGS. 3a-3c, 3f, and 3g depict the subsequent formation of a widthwise-oriented cylinder (3f), followed by formation of a three-dimensional hemispheric dome (3g).

Figure 4A:
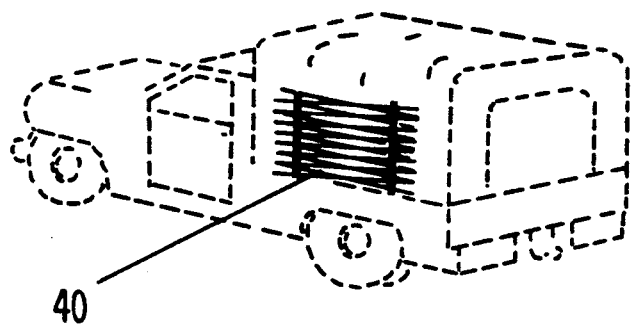
FIG. 4a depicts transport of a planar array in collapsed state.
Figure 4B:
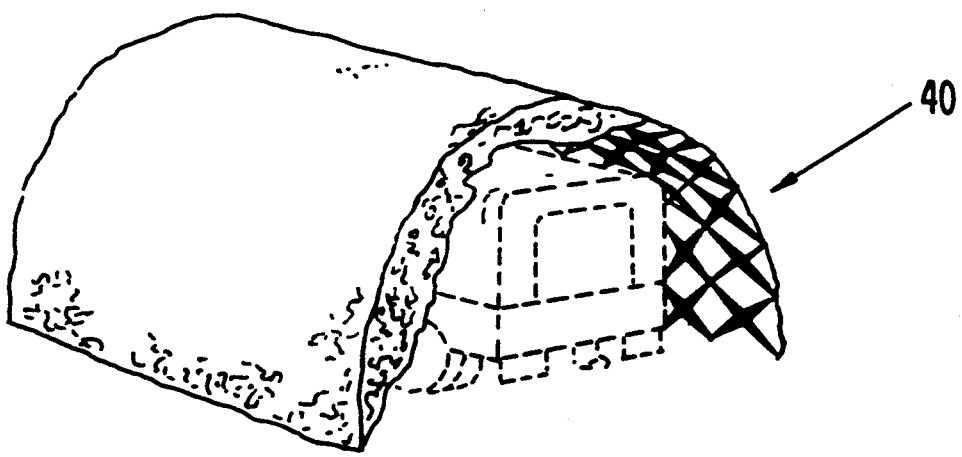
FIG. 4b depicts the planar array of FIG. 4a in an arch configuration.

FIG. 4a illustrates a planar array 40 in collapsed state aboard a truck. FIG. 4b shows such planar array extended and erected in three-dimensional semicylindrical configuration. While depicted as being draped in camouflage, thereby implying temporary usage and non-permanent fixing means, the planar array could be permanently fixed as by welds, brazes, soldered joints, and the like. If fixed by injectable hardenable substances on the exterior or interior or both, using, for example, GUNITE ®, concrete, mud, or the like, the planar array is both fixed and covered simultaneously, resulting in a permanent or semi-permanent building.

Figure 5:
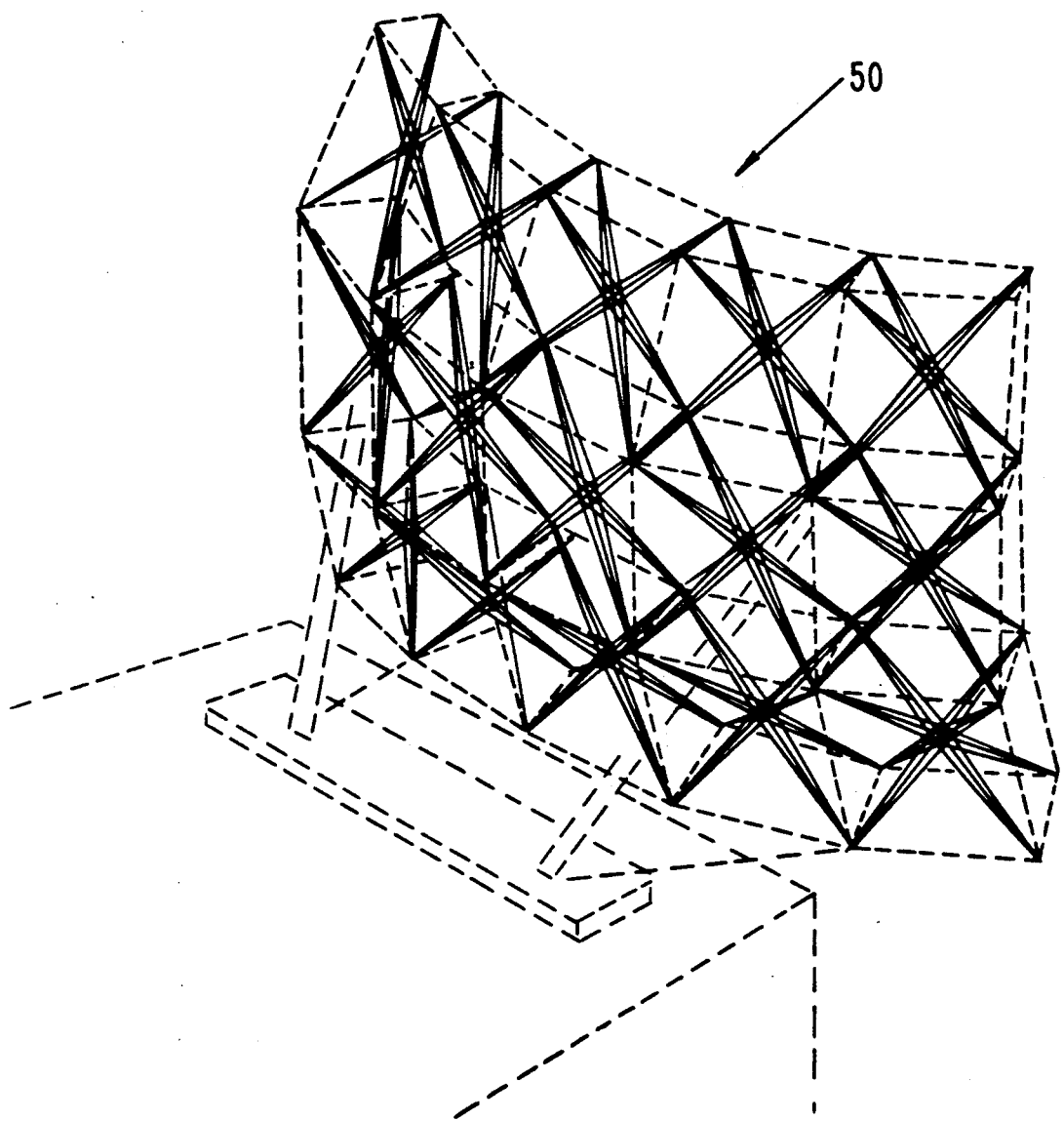
FIG. 5 depicts a planar array in an antenna configuration.
Figure 6A:
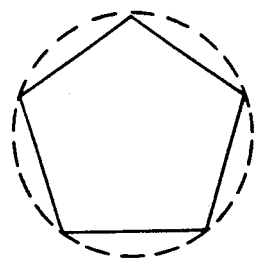
FIG. 6a schematically shows a plurality of bundles joined in a pentagonal configuration.
Figure 6B:
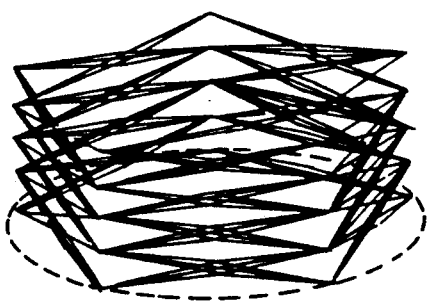
FIG. 6b shows such pentagonal configuration in a collapsed state.
Figure 6C:
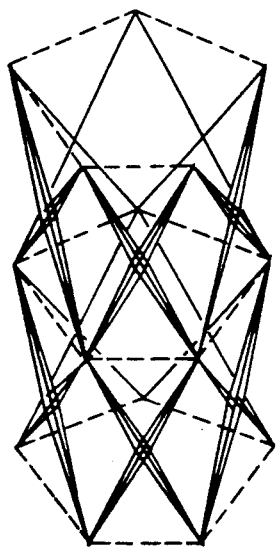
FIG. 6c illustrates the pentagonal configuration extended in a column.
Figure 6D:
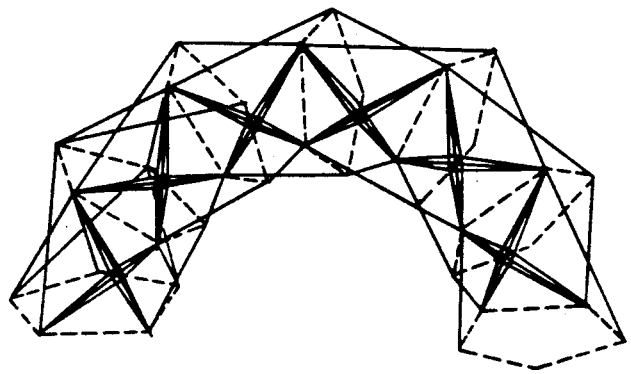
FIG. 6d depicts the pentagonal configuration curved into an arch.

FIG. 5 illustrates planar array 50 comprising a framework for an antenna. Whether covered or uncovered, such planar array comprises linear arrays which in turn comprise multi-wire bundles or joints attached and fixed by the means disclosed herein or in prior Parent U.S. Pat. No. 4,927,674, or other means, common to the art. Planar array 50 may also comprise a framework for buildings, such as walls, floors, or roofs.

FIG. 6 illustrates a "three-dimensional" preferred embodiment of the invention. Woven wire multi-wire bundles or joints are initially disposed and attached in a planar pentagonal configuration circumscribable by a circle, as shown in FIG. 6a. FIG. 6b shows the bundles in collapsed state; FIG. 6c shows the structure extended three-dimensionally and fixed, forming a polyhedral columnar or cylindrical configuration. FIG. 6d shows the invention configured as an arch. The columnar configuration of FIG. 6 can be employed in a structures, such as a cylindrical building, a tunnel or overpass structure, an elevator shaft, and the like.

FIG. 7 also depicts a three-dimensional embodiment comprising eight multi-wire bundles or joints, comprising three multi-wire elements per bundle, initially disposed and connected in a planar hexagonal configuration, as shown in FIG. 7a. A single joint is depicted in FIG. 7c; expansion and fixing the structure results in a three-dimensional rhombic dodecahedron of a cubic pattern (see FIG. 7b) circumscribable by hexagon, depicted in FIG. 7d or a sphere, depicted in FIG. 7e.

Figure 8:
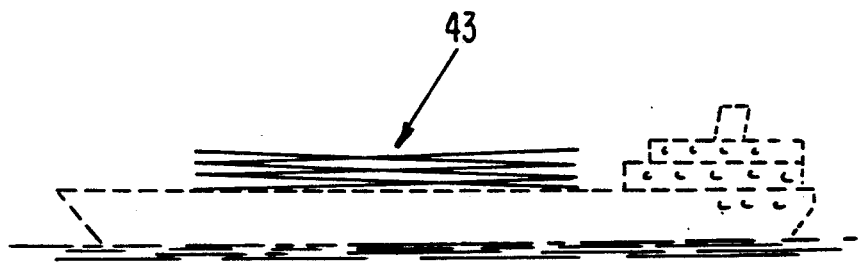
FIG. 8 depicts transport of a collapsed three-dimensional configuration.
Figure 9:
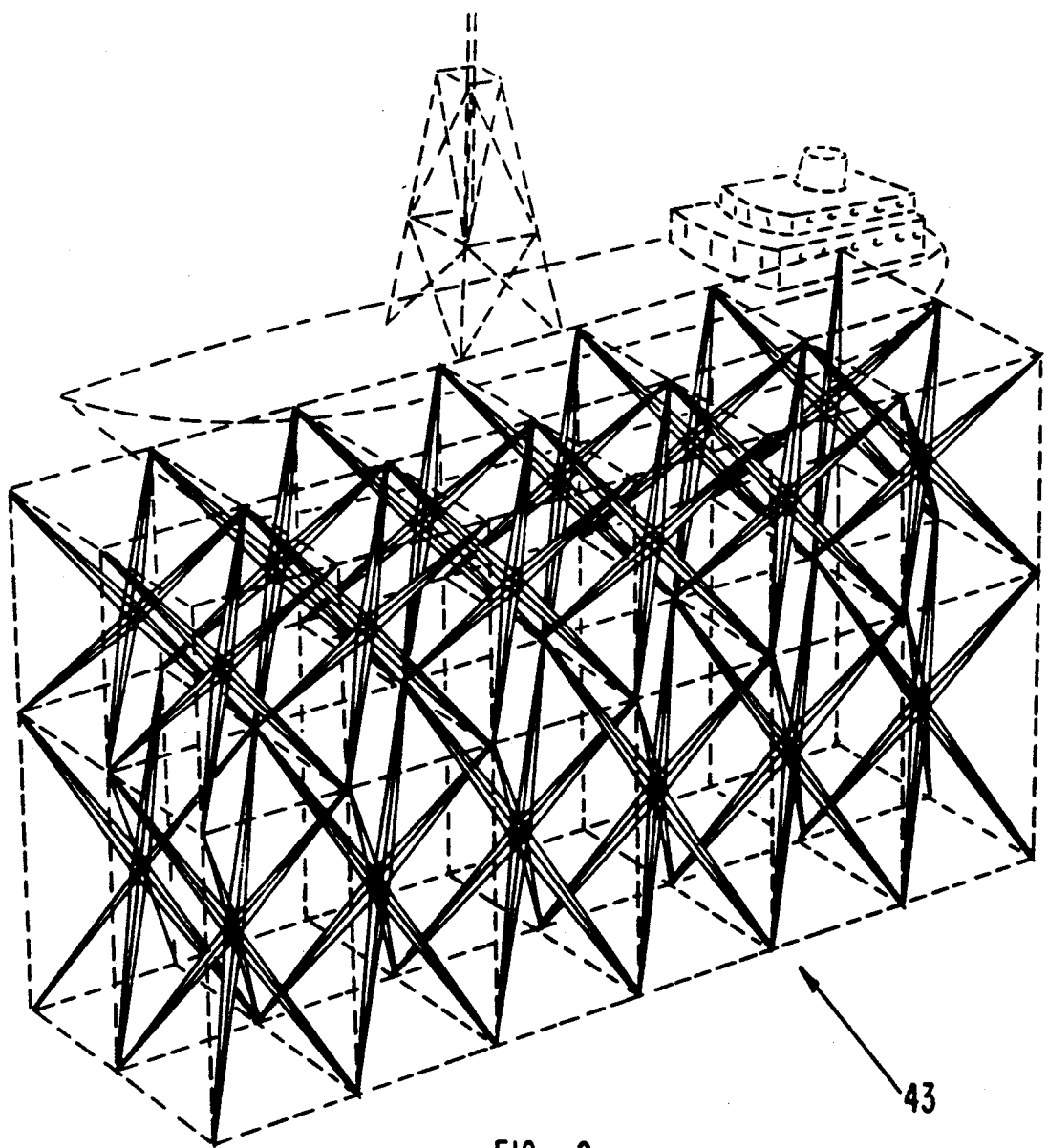
FIG. 9 depicts a three-dimensional configuration of FIG. 8 extended and fixed.

FIG. 7f further depicts this embodiment. By further analogy to the crystallographic example, this configuration may be likened to a three-dimensional unit cell; reference to FIG. 7f illustrates how a plurality of such units may comprise a lattice-type framework. The uses of such framework are many and varied, since it comprises a basic building block configuration. One such use is illustrated in FIGS. 8 and 9. FIG. 8 depicts a lattice-type three-dimensional framework 43 in collapsed state aboard a ship. FIG. 9 shows such framework 43 in an extended and fixed configuration. Such framework could be used in a variety of buildings, oil derricks, towers, and the like.

Figure 10:
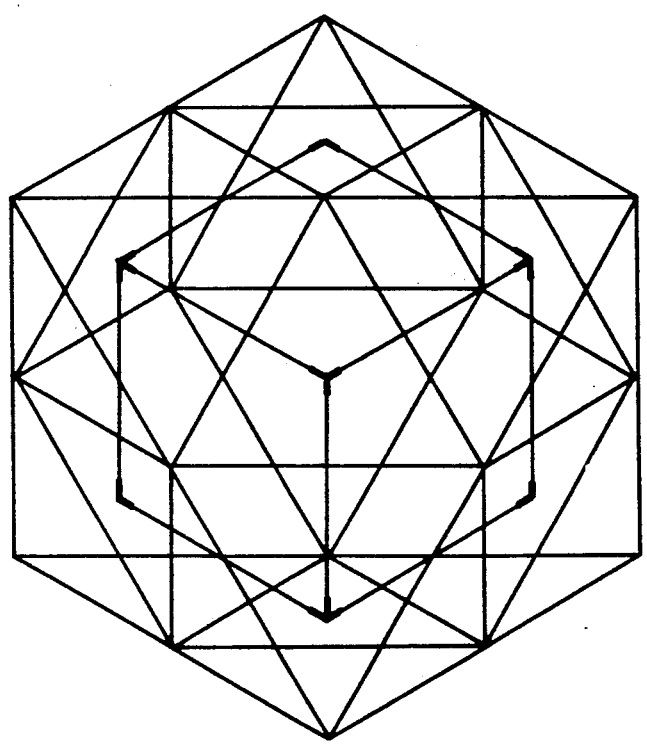
FIG. 10 depicts the hexagonal configuration of FIGS. 7a-7d with additional bundles to create a different system.

FIG. 10 depicts a basic hexagonal configuration of FIG. 7 wherein additional multi-wire bundles or joints can be attached at the midpoints of the lines or end points of joints connected to form different configurations and systems. The use of flexible end connectors permits shaping these configurations; thereafter, the joints may be fixed as heretofore disclosed.

Figure 11C:
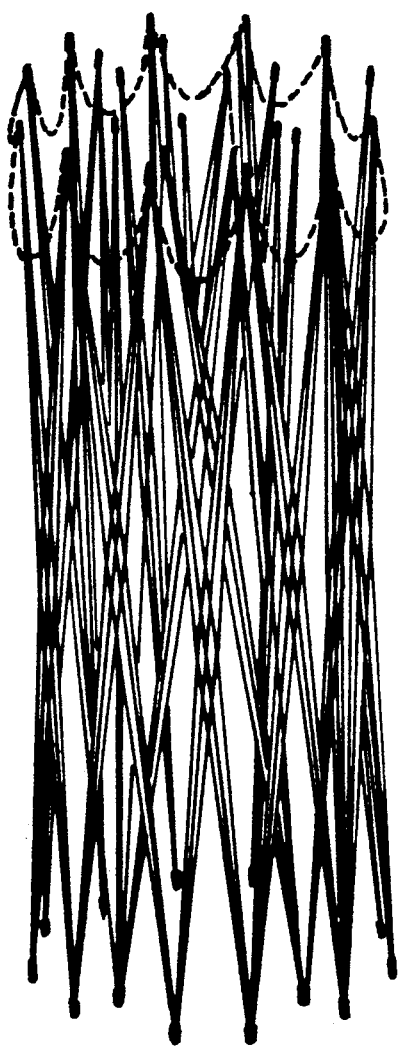
FIG. 11c depicts the hemispherical configuration of FIG. 11b in collapsed state.
Figure 11D:
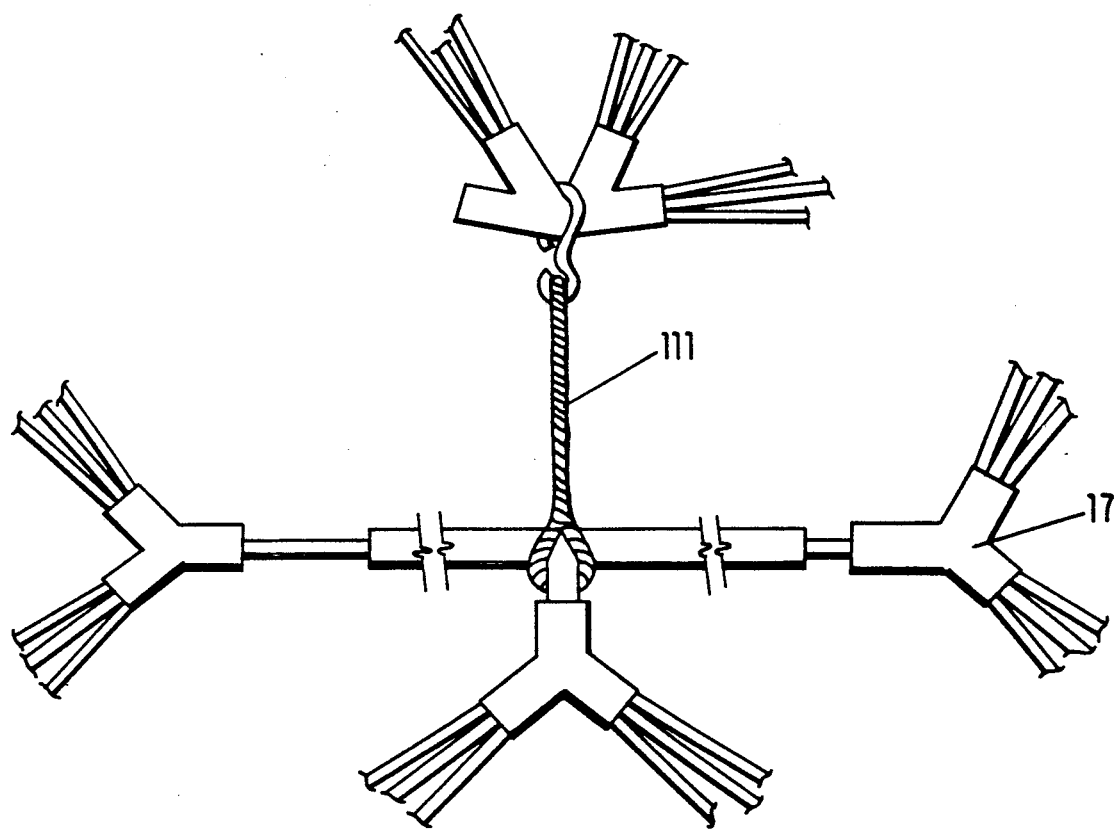
FIG. 11d tension cable connection means.

FIGS. 11a and 11b depict top and side views, respectively, of a spherical and hemispherical configuration comprising thirty and twenty-one multi-wire bundles or joints. This embodiment comprises rigid end joining means 17, and tension cable fixing means 111 (see FIG. 11d). FIG. 11c depicts the FIG. 11a embodiment in a collapsed state; FIG. 11d illustrates, in detail, rigid end connector 17 and tension cable 111 utilized in this embodiment.

FIG. 12 shows an embodiment of the invention similar to the FIG. 7 embodiment with the exception that only two multi-wire elements per bundle are utilized. This results in a lighter, more open polyhedral cubic structure, circumscribable by a sphere.

Figure 13A:
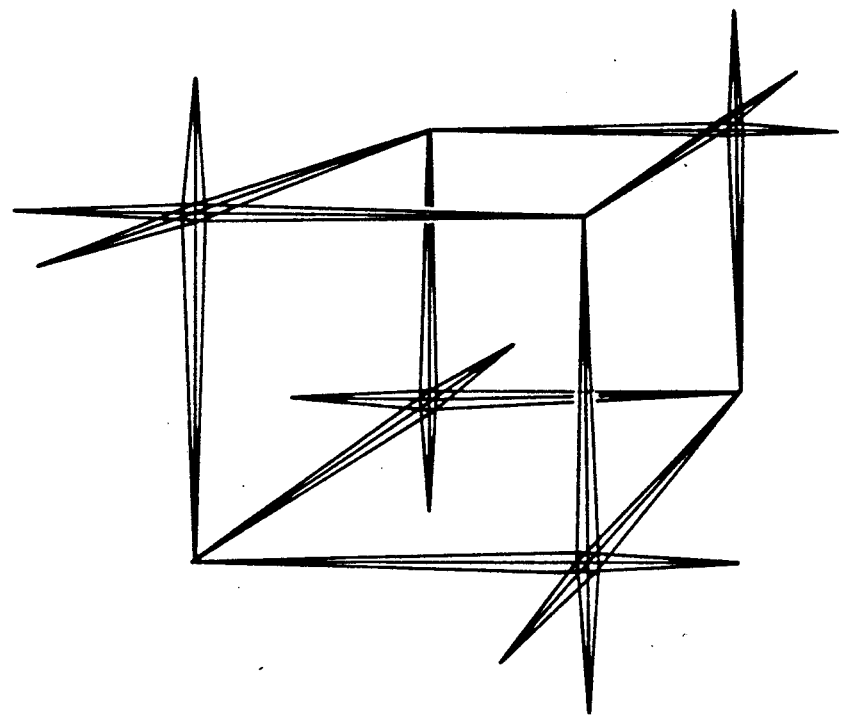
FIG. 13a depicts a cubic structure.
Figure 13B:
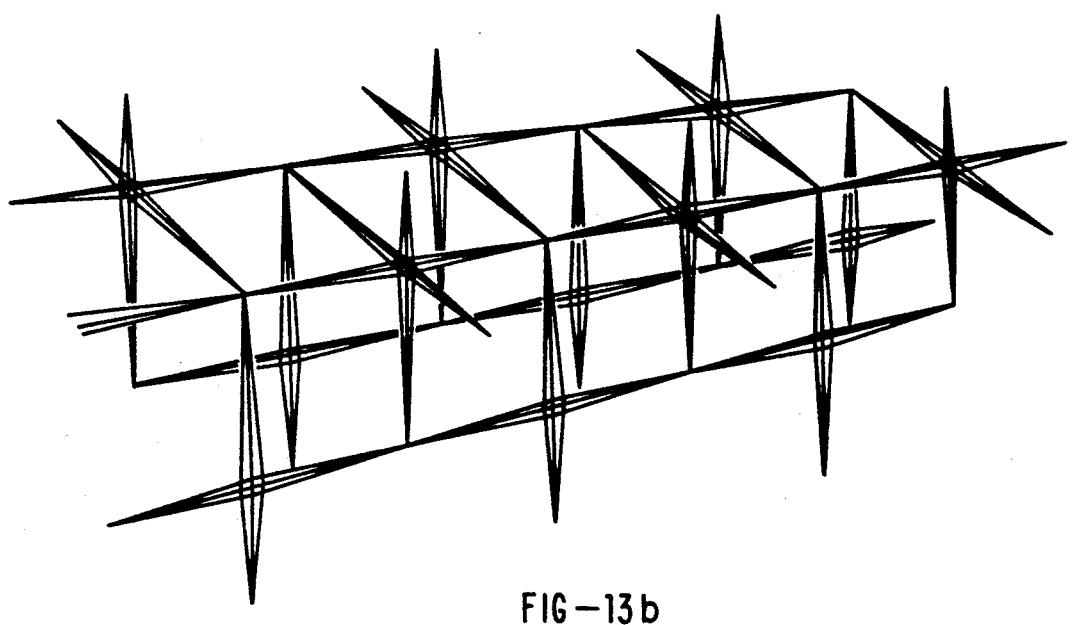

FIG. 13a depicts a three-dimensional cubic structure comprising three multi-wire elements per bundle, with four bundles per cell of seven cells (13b). FIG. 13c illustrates the spiral collapsing (see arrows) of the FIG. 13b structure. FIGS. 13d and 13e show the FIG. 13b structure in a collapsed and bundled state. Suitable fixing means, as heretofore disclosed, may be used to render the structure permanent.

FIG. 14 illustrates a polyhedral columnar embodiment comprising the cubic configuration embodiment of FIG. 7a, a plurality of such cubic structures, laterally disposed, are attached or connected to form a column.

Although the drawings illustrate particular "three-dimensional" cubic and polyhedronal (or polygonal-sided) structures, the invention is not limited to those structures shown. As can be appreciated by those skilled in the art, the three-dimensional structures of the preferred embodiment of the invention may comprise any polygonal or polyhedral shapes.

Figure 15:
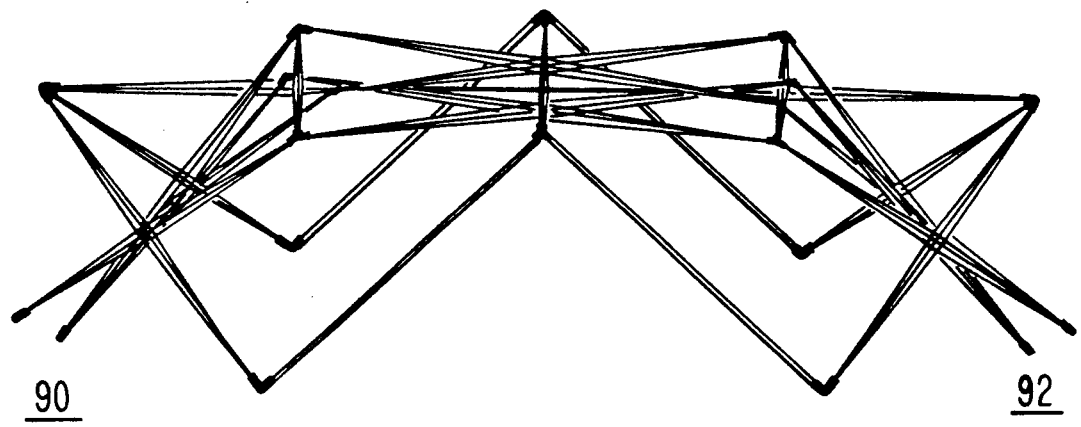
FIG. 15 a dome structure.

FIG. 15 illustrates a dome structure formed of multiple bundles and other members. This dome can be fixed by securing points 90 and 92 to a ground plane. As used herein, the term "dome structure" is intended to include a cover, shelter, support, or receptacle.

Figure 16:
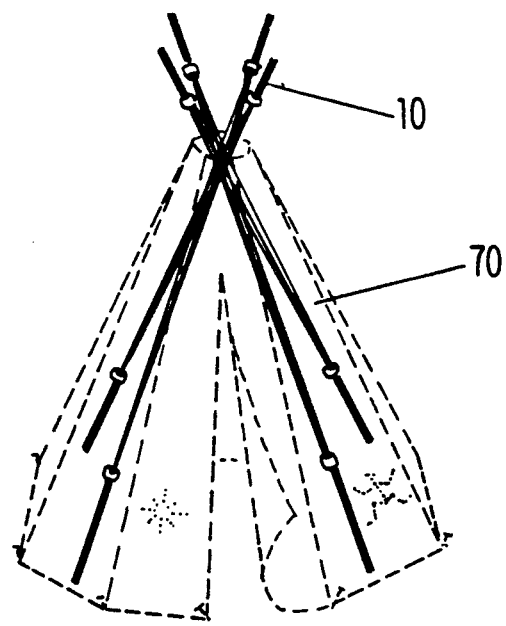
FIG. 16 a tee-pee structure.

In an alternative embodiment, the invention comprises a single bundle useful as a structure, such as the tee-pee illustrated in FIG. 16. The tee-pee comprises a single bundle or unit 10 fixed into position by staking or otherwise fixing the lower ends of the bundle to the ground plane or surface. Also, the tenting material 70 helps to fix the bundle in position. Although FIG. 16 illustrates the use of tenting material 70, fixing of a more permanent nature, such as the use of cc GUNITE ®, concrete, mud, other hardenable substances, or the like, may be affixed to the exterior or interior of the tee-pee structure. Likewise the joint or the wires may be fixed in position by means disclosed in prior Parent U.S. Pat. No. 4,927,674 (retainer rings, tubes, cinches, straps, clips, and the like) or by other fixing means, such as welds, bolts, brazes, soldering, and the like, well known in the art.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A woven wire structural unit comprising:
   at least two bundles, each said bundle comprising a plurality of intersecting multi-stranded wire elements comprising two ends;
   connecting means for connecting respective ends of said bundles; and
   fixing means for imparting rigidity to said woven wire structural unit.

2. The invention of claim 1 wherein said bundles are collapsible.

3. The invention of claim 1 wherein a plurality of said bundles are connected in a linear array.

4. The invention of claim 3 wherein said linear array comprises a tower configuration.

5. The invention of claim 3 wherein said linear array comprises an arch configuration.

6. The invention of claim 3 wherein a plurality of said linear arrays are connected to form a planar array.

7. The invention of claim 6 wherein said linear arrays are connected in parallel mirror configuration.

8. The invention of claim 6 wherein said linear arrays are connected in parallel translated configuration.

9. The invention of claim 6 wherein said linear arrays are connected in parallel mirror and translated configurations.

10. The invention of claim 1 wherein a plurality of said bundles are connected in a planar array.

11. The invention of claim 1 wherein a plurality of said bundles are connected in a three-dimensional array.

12. The invention of claim 11 wherein said three-dimensional array comprises a polyhedronal array.

13. The invention of claim 12 wherein said polyhedronal array comprises a hemispherically disposed array.

14. The invention of claim 12 wherein said polyhedronal array comprises a spherically disposed array.

15. The invention of claim 12 wherein said polyhedronal array comprises a cylindrically disposed array.

16. The invention of claim 12 wherein said polyhedronal array comprises a cubically disposed array.

17. The invention of claim 11 wherein said three-dimensional array comprises a polyhedral columnar configuration.

18. The invention of claim 17 wherein said polyhedral columnar configuration extends from a planar polygonal array.

19. The invention of claim 1 wherein said connecting means comprises movable connecting means.

20. The invention of claim 1 wherein said connecting means comprises fixed connecting means.

21. The invention of claim 1 wherein said fixing means comprises ring means.

22. The invention of claim 1 wherein said fixing means comprises weld means.

23. The invention of claim 1 wherein said fixing means comprises bolt means.

24. The invention of claim 1 wherein said fixing means comprises soldered means.

25. The invention of claim 1 wherein said fixing means comprises hardenable substance means.

26. The invention of claim 25 wherein said hardenable substance means comprises at least one member selected from the group consisting of concrete, GUNITE ®, fusible alloys, mud, glass, and ceramics.

27. The invention of claim 25 wherein said hardenable substance means is injectable.

28. The invention of claim 1 wherein said fixing means comprises covering means.

29. The invention of claim 28 wherein said covering means comprises fabric.

30. The invention of claim 1 wherein fewer than all of said bundles are fixed.

31. The invention of claim 1 wherein said fixing means permits limited movement of said bundles.

32. The invention of claim 1 wherein each of said mutually intersecting multi-stranded wire elements comprises a like plurality of wires.

33. The invention of claim 1 wherein said multi-stranded wire elements comprise wires of substantially similar length.

34. The invention of claim 1 wherein said multi-stranded wire elements comprise wires of substantially different length.

35. The invention of claim 1 wherein said multi-stranded wire elements comprise hollow wires for transmitting at least one member selected from the group consisting of solids, liquids, and electricity.

36. The invention of claim 1 wherein each of said multi-stranded wire elements comprises an odd number of wires.

37. The invention of claim 36 wherein said multi-stranded wire element comprises at least three wires.

38. The invention of claim 1 wherein each said multi-stranded wire element is of substantially like length to provide a generally symmetric apparatus.

39. The invention of claim 1 wherein at least one said multi-stranded wire element is of substantially different length from said other multi-stranded wire elements.

40. The invention of claim 1 wherein said apparatus further comprises support members.

41. The invention of claim 1 useful as a support structure.

42. The invention of claim 1 useful as a dome structure.

43. The invention of claim 1 useful as a woven fabric structure.

44. A woven wire structural unit comprising:
a bundle comprising a plurality of intersecting multi-stranded wire elements comprising two ends;
means for positioning said multi-stranded wire elements in a mutually intersecting relationship to one another;
means for joining said first end and means for joining said second end of said multi-stranded wire elements whereby said elements are thereby retained in said intersecting relationship to one another; and
fixing means additional to said positioning means and said joining means for fixing said bundle in a rigid position.

45. The invention of claim 44 wherein said fixing means comprises ring means.

46. The invention of claim 44 wherein said fixing means comprises bolt means.

47. The invention of claim 44 wherein said fixing means comprises soldered means.

48. The invention of claim 44 wherein said fixing means comprises hardenable substance means.

49. The invention of claim 48 wherein said hardenable substance means comprises at least one member selected from the group consisting of concrete, GUNITE ®, fusible alloys, mud, glass, and ceramics.

50. The invention of claim 44 wherein said hardenable substance means is injectable.

51. The invention of claim 44 wherein said fixing means comprises covering means.

52. The invention of claim 51 wherein said covering means comprises fabric.

53. The invention of claim 44 useful as a tee-pee structure.

* * * * *